United States Patent
Imai et al.

[11] Patent Number: 5,847,856
[45] Date of Patent: Dec. 8, 1998

[54] OPTICAL POWER MONITOR DEVICE, OPTICAL AMPLIFIER, AND OPTICAL TRANSMITTER

[75] Inventors: Kazuto Imai; Tsukasa Takahashi, both of Sapporo, Japan

[73] Assignee: Fujitsu Limited, Kawasaki, Japan

[21] Appl. No.: 816,902

[22] Filed: Mar. 13, 1997

[30] Foreign Application Priority Data

Nov. 19, 1996 [JP] Japan .................................. 8-307803

[51] Int. Cl.$^6$ .................................................. H04B 10/08
[52] U.S. Cl. .......................... 359/180; 359/110; 359/177
[58] Field of Search .................................. 359/110, 177, 359/175, 174, 176, 179, 173, 171, 180

[56] References Cited

U.S. PATENT DOCUMENTS

| | | | |
|---|---|---|---|
| 5,162,936 | 11/1992 | Taga et al. ................................ | 359/177 |
| 5,170,274 | 12/1992 | Kuwata et al. . | |
| 5,184,242 | 2/1993 | Yamashita ................................ | 359/177 |
| 5,282,074 | 1/1994 | Miyazaki ................................ | 359/177 |
| 5,729,373 | 3/1998 | Sakuyama ................................ | 359/110 |

FOREIGN PATENT DOCUMENTS 1-14739  1/1989  Japan .
2-209031  8/1990  Japan .

*Primary Examiner*—Rafael Bacares
*Attorney, Agent, or Firm*—Staas & Halsey

[57] ABSTRACT

An optical power monitor device capable of monitoring optical power with the influence of optical crosstalk eliminated, and an optical amplifier and an optical transmitter each having the monitor device. The monitor device is applied to a light source for outputting first and second beams, for example. The first beam is divided into first and second branch beams by a beam splitter. The first branch beam is supplied to a first photodetector. The first photodetector outputs a first signal having a level corresponding to the power of the first branch beam. The second beam from the light source is supplied to a second photodetector. The second photodetector outputs a second signal having a level corresponding to the power of the second beam. The first and second signals are supplied to a first subtracter. The first subtracter outputs a first error signal corresponding to the difference between the first and second signals. The first signal and the first error signal are supplied to a second subtracter. The second subtracter outputs a second error signal corresponding to the difference between the first signal and the first error signal. Thus, the second error signal is obtained by using the first and second subtracters to thereby cancel a noise component caused by optical crosstalk and therefore eliminate the influence of optical crosstalk from the second error signal.

27 Claims, 8 Drawing Sheets

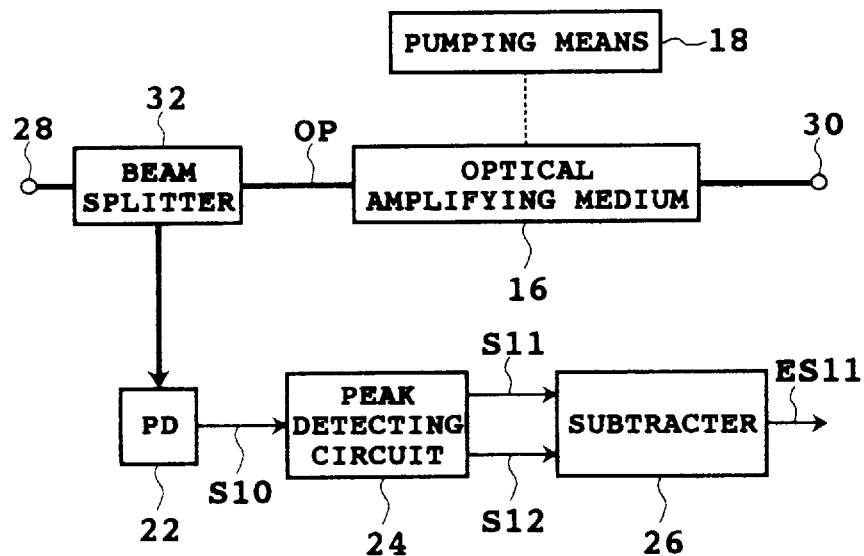
F I G. 4A
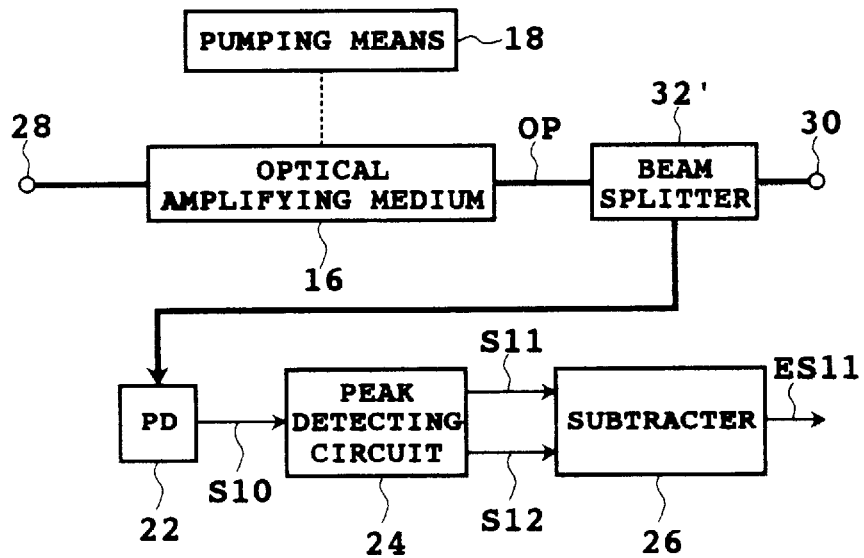
F I G. 4B

OPTICAL POWER MONITOR DEVICE, OPTICAL AMPLIFIER, AND OPTICAL TRANSMITTER

BACKGROUND OF THE INVENTION

1. Field of the Invention

The present invention relates generally to optical power monitoring which can cancel optical crosstalk, and more particularly to an optical power monitor device, and an optical amplifier and an optical transmitter each having the optical power monitor device.

2. Description of the Related Art

In recent years, an optical amplifier such as typically, an erbium doped fiber amplifier (EDFA) has been put to practical use, and the power of light to be handled has been increased. Accordingly, it is required to perform monitoring of optical power with the influence of optical crosstalk eliminated.

Conventionally known is an optical amplifier including an optical amplifying medium and means for pumping the optical amplifying medium so that the optical amplifying medium has a gain band. In an optical pumping type of optical amplifier, pump light having a wavelength properly set according to the wavelength of signal light to be amplified is supplied to an erbium doped fiber (EDF), for example. When signal light is input into the EDF being pumped, the signal light is amplified in the EDF in accordance with the principle of stimulated emission.

Also known is a semiconductor laser type of optical amplifier. In this type, a bias current is supplied to an optical amplifying medium provided as a semiconductor chip, thereby pumping the optical amplifying medium.

In a practical optical amplifier, optical power is monitored for various purposes. For example, the power of signal light to be supplied to an optical amplifying medium is monitored, so as to stop pumping of the optical amplifying medium when the signal light input into the optical amplifier is cut off. Since the power of the signal light input into the optical amplifier is small, it is desirable to eliminate the influence of optical crosstalk. The optical crosstalk is caused by, for example, ASE (amplified spontaneous emission) generated in the optical amplifying medium.

SUMMARY OF THE INVENTION

It is therefore an object of the present invention to provide an optical power monitor device which can eliminate the influence of optical crosstalk.

It is another object of the present invention to provide an optical amplifier having an optical power monitor device which can eliminate the influence of optical crosstalk.

It is still another object of the present invention to provide an optical transmitter having an optical power monitor device which can eliminate the influence of optical crosstalk.

In accordance with a first aspect of the present invention, there is provided an optical power monitor device for a light source outputting first and second beams. The first beam is divided into first and second branch beams by a beam splitter. The first branch beam is supplied to a first photodetector. The first photodetector outputs a first signal having a level corresponding to the power of the first branch beam. The second beam from the light source is supplied to a second photodetector. The second photodetector outputs a second signal having a level corresponding to the power of the second beam. The first and second signals are supplied to a first subtracter. The first subtracter outputs a first error signal corresponding to the difference between the first and second signals. The first signal and the first error signal are supplied to a second subtracter. The second subtracter outputs a second error signal corresponding to the difference between the first signal and the first error signal.

In this manner, the second error signal is obtained by using the first and second subtracters to thereby cancel a noise component caused by optical crosstalk and therefore eliminate the influence of optical crosstalk from the second error signal.

In accordance with a second aspect of the present invention, there is provided an optical transmitter having the optical power monitor device according to the first aspect of the present invention. The optical transmitter further has the above-mentioned light source, an optical amplifying medium, and means for pumping the optical amplifying medium so that the optical amplifying medium has a gain band. The second branch beam from the beam splitter is supplied to the optical amplifying medium. The wavelength of the second branch beam is included in the gain band.

In this optical transmitter, the influence of optical crosstalk due to ASE generated in the optical amplifying medium can be effectively eliminated.

In accordance with a third aspect of the present invention, there is provided an optical power monitor device for an optical amplifier having an optical path including an optical amplifying medium. A photodetector is operatively connected to the optical path. The photodetector outputs an electrical signal having a level corresponding to an optical power in the optical path. The electrical signal is supplied to a peak detecting circuit. The peak detecting circuit outputs a first signal providing a first peak level corresponding to a maximum level of the electrical signal and a second signal providing a second peak level lower than the first peak level. The first and second signals are supplied to a subtracter. The subtracter outputs an error signal corresponding to the difference between the first and second signals.

The optical power in the optical path is reflected in the error signal. Furthermore, a component of optical crosstalk is canceled by the operation of the peak detecting circuit. Accordingly, it is possible to perform monitoring of the optical power with the influence of optical crosstalk eliminated.

In accordance with a fourth aspect of the present invention, there is provided an optical amplifier having the optical power monitor device according to the third aspect of the present invention. The optical amplifier further has the above-mentioned optical amplifying medium and pumping means, and a beam splitter. The beam splitter divides an optical beam propagating along the optical path into first and second branch beams. The first branch beam is supplied to the photodetector. The optical path including the optical amplifying medium is set between an input port and an output port. The beam splitter is provided between the input port and the optical amplifying medium or between the optical amplifying medium and the output port, for example.

Also in this optical amplifier, the influence of optical crosstalk can be effectively eliminated as similarly to the device according to the third aspect of the present invention.

In this specification, the wording that an element and another element are operatively connected includes the case that these elements are directly connected, and also includes the case that these elements are so provided as to be related with each other to such an extent that an electrical signal or an optical signal can be mutually transferred between these elements.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIGS. 4A and 4B are block diagrams showing basic configurations of the optical amplifier according to the present invention;

DETAILED DESCRIPTION OF THE PREFERRED EMBODIMENTS

Some preferred embodiments of the present invention will now be described in detail with reference to the attached drawings.

Figure 1:
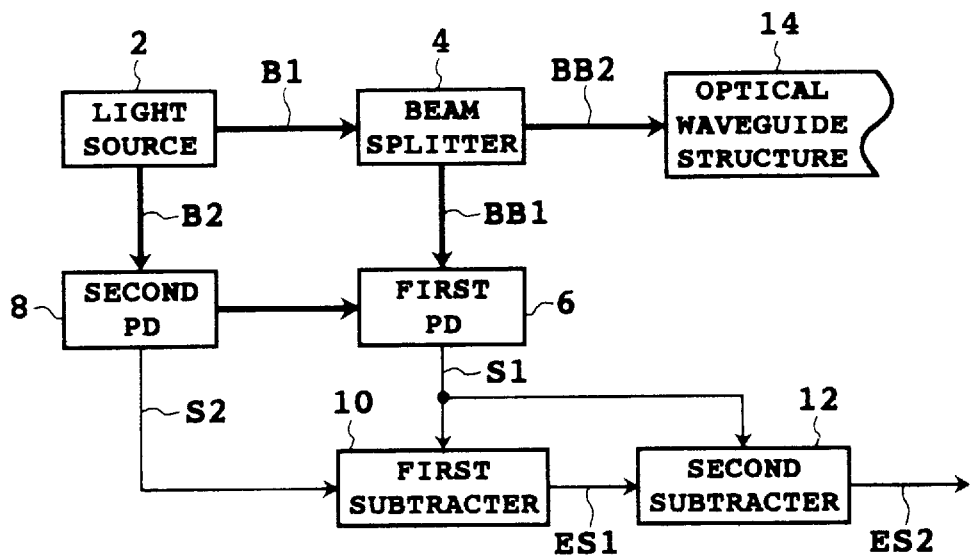
FIG. 1 is a block diagram showing a first basic configuration of the optical power monitor device according to the present invention.

Referring to FIG. 1, there is shown a first basic configuration of the optical power monitor device according to the present invention. This device is usable for a light source 2 for outputting a first beam B1 and a second beam B2. The light source 2 is, for example, a laser diode for outputting forward light and backward light as will be described later. The power of the backward light has a linear relation to the power of the forward light.

The first beam B1 is divided into a first branch beam BB1 and a second branch light BB2 by a beam splitter 4. The first branch beam BB1 is supplied to a first photodetector 6. The photodetector 6 outputs a first signal S1 having a level corresponding to the power of the branch beam BB1. The second beam B2 from the light source 2 is supplied to a second photodetector 8. The photodetector 8 outputs a second signal S2 having a level corresponding to the power of the beam B2. The signals S1 and S2 are supplied to a first subtracter 10. The subtracter 10 outputs a first error signal ES1 corresponding to the difference between the signals S1 and S2. The first signal Si and the first error signal ES1 are supplied to a second subtracter 12. The subtracter 12 outputs a second error signal ES2 corresponding to the difference between the signals S1 and ES1.

It is now assumed that the first photodetector 6 is under the influence of optical crosstalk. In this case, the influence of optical crosstalk is exhibited by the signal S1 output from the photodetector 6. However, since the signal S1 is input to the two subtracters 10 and 12 cascaded together, a component due to the optical crosstalk is canceled, so that the error signal ES2 output from the subtracter 12 is not influenced by the optical crosstalk.

The level of the error signal ES2 corresponds to the powers of the two beams B1 and B2 output from the light source 2, so that this preferred embodiment allows monitoring of optical power with the influence of optical crosstalk eliminated.

In the case that the branch beam BB2 from the beam splitter 4 is supplied to an optical waveguide structure 14 as shown in FIG. 1, returned light from the optical waveguide structure 14 (e.g., reflected light from a fiber end) becomes optical crosstalk. However, the influence of this optical crosstalk is eliminated in accordance with the above-mentioned principle in this optical power monitor device. Particularly in the case that the optical waveguide structure 14 includes an optical amplifying medium generating ASE as in an optical amplifier to be hereinafter described, the influence of optical crosstalk due to the ASE can be effectively eliminated.

Figure 2:
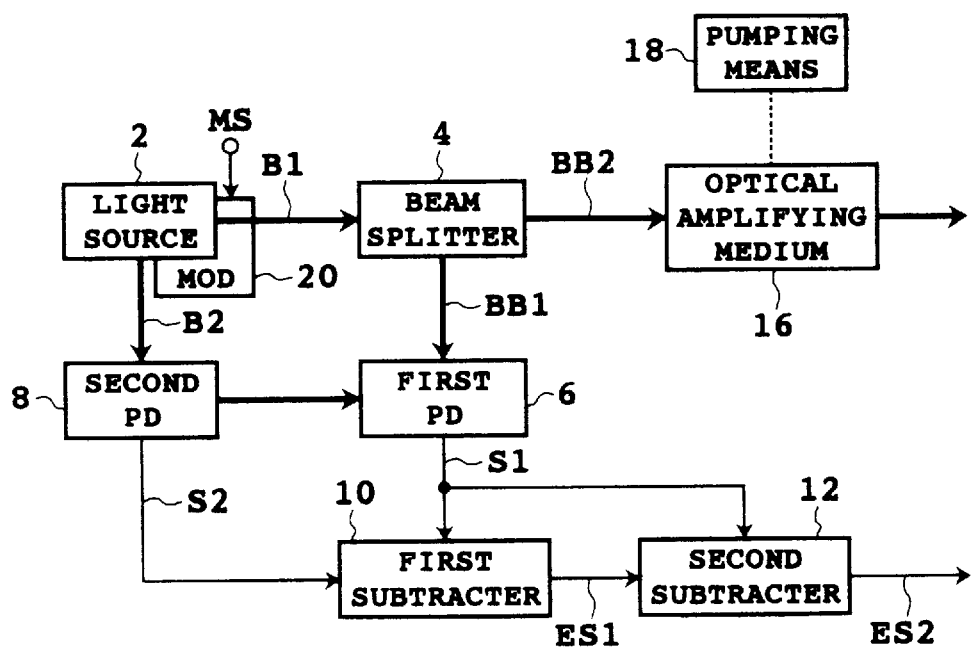
FIG. 2 is a block diagram showing a basic configuration of the optical transmitter according to the present invention.

Referring to FIG. 2, there is shown a basic configuration of the optical transmitter according to the present invention. This optical transmitter includes the light source 2, the optical power monitor device shown in FIG. 1, an optical amplifying medium 16, and pumping means 18.

The optical amplifying medium 16 is operatively connected to the beam splitter 4 to receive the second branch beam BB2 from the beam splitter 4. The pumping means 18 pumps the optical amplifying medium 16 so that the optical amplifying medium 16 has a gain band. In this configuration, the gain band includes the wavelength of the branch beam BB2. Modulating means 20 is operatively connected to the light source 2, so as to modulate at least the beam B1 of the beams B1 and B2 output from the light source 2 according to a main signal MS. In the case of carrying out direct modulation of a laser diode, the modulating means 20 includes means for superimposing a modulating current corresponding to the main signal MS on a DC or controlled bias current to be supplied to the laser diode. In the case that the light source 2 outputs carrier light having a constant power, the modulating means 20 includes an optical modulator for modulating the carrier light.

In this optical transmitter, the beam B1 becomes signal light. A branching ratio between the branch beams BB1 and BB2 in the beam splitter 4 is 1:10, for example. The branch beam BB2 is amplified by the optical amplifying medium 16 and next transmitted to an optical transmission line not shown.

Thus, the optical transmitter has a post-amplifier comprising the optical amplifying medium 16 and the pumping means 18, so that a large output power can be obtained.

Further, the power of signal light to be supplied to the optical amplifying medium 16 can be accurately monitored without being influenced by optical crosstalk due to ASE or the like generated from the optical amplifying medium 16.

Figure 3:
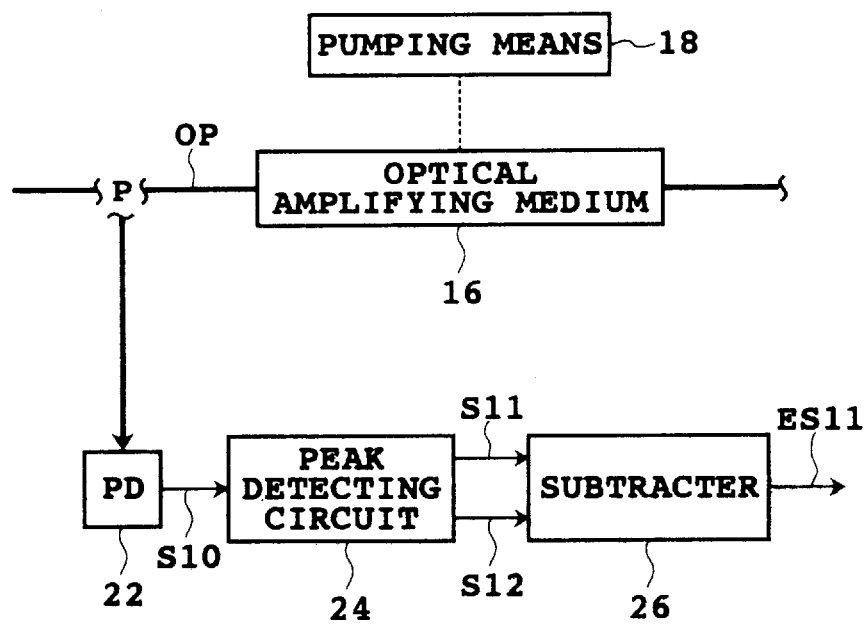
FIG. 3 is a block diagram showing a second basic configuration of the optical power monitor device according to the present invention.

Referring to FIG. 3, there is shown a second basic configuration of the optical power monitor device according to the present invention. This optical power monitor device is usable for an optical amplifier having an optical path OP including the optical amplifying medium 16.

A photodetector 22 is operatively connected to the optical path OP. The photodetector 22 outputs an electrical signal S10 having a level corresponding to the optical power P in the optical path OP. The signal S10 is supplied to a peak detecting circuit 24. The circuit 24 outputs a first signal S11 providing a first peak level corresponding to a maximum level of the signal S10 and a second signal S12 providing a second peak level lower than the first peak level. The first and second signals S11 and S12 are supplied to a subtracter 26. The subtracter 26 outputs an error signal ES11 corresponding to the difference between the signals S11 and S12.

In an optical amplifier used for optical communication, the optical power P in the optical path OP is modulated by a main signal and/or a supervisory signal. Accordingly, by using such a peak detecting circuit as mentioned above, monitoring of the optical power P can be carried out without the influence of optical crosstalk.

Referring to FIGS. 4A and 4B, there are shown two basic configurations of the optical amplifier according to the present invention. In each configuration, the optical path OP including the optical amplifying medium 16 is set between an input port 28 and an output port 30. The optical amplifying medium 16 is pumped by the pumping means 18, thereby obtaining a gain band.

In the configuration shown in FIG. 4A, a beam splitter 32 operatively connected to the photodetector 22 is provided between the input port 28 and the optical amplifying medium 16. In accordance with the principle of operation of the optical power monitor device shown in FIG. 3, the optical power of an input beam to be supplied to the optical amplifying medium 16 is provided according to the error signal ES11.

In contrast with FIG. 4A, the configuration shown in FIG. 4B is characterized in that a beam splitter 32' operatively connected to the photodetector 22 is provided between the optical amplifying medium 16 and the output port 30. With this configuration, the power of a beam directed from the optical amplifying medium 16 to the output port 30 or the power of a beam directed from the output port 30 to the optical amplifying medium 16 is provided according to the error signal ES11. The beam directed from the optical amplifying medium 16 to the output port 30 is amplified signal light, for example, whereas the beam directed from the output port 30 to the optical amplifying medium 16 is returned light from an end face of an optical fiber not shown, for example.

The operation of the peak detecting circuit in each of the optical power monitor devices shown in FIGS. 3, 4A, and 4B will now be described with reference to FIGS. 5A and 5B.

Figure 5A:
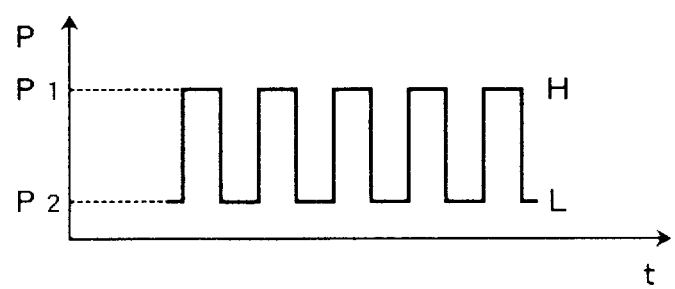
FIGS. 5A and 5B are graphs illustrating the operation of a peak detecting circuit.

Referring to FIG. 5A, there is shown a case where the optical power P is modulated by a main signal having a high level (H) and a low level (L). The vertical axis represents optical power P, and the horizontal axis represents time t. In this case, the first peak level in the peak detecting circuit 24 corresponds to an optical power $P_1$ providing the high level, and the second peak level corresponds to an optical power $P_2$ providing the low level. That is, the signals S11 and S12 to be supplied from the peak detecting circuit 24 to the subtracter 26 respectively correspond to the optical powers $P_1$ and $P_2$. An average optical power of signal light in the optical path OP. is reflected by $(P_1-P_2)$, and a noise component due to optical crosstalk is superimposed on both the high level (H) and the low level (L). Accordingly, by obtaining the error signal ES11 corresponding to the difference between the signals S11 and S12 by means of the subtracter 26, the average optical power in the optical path OP can be accurately monitored.

Figure 5B:
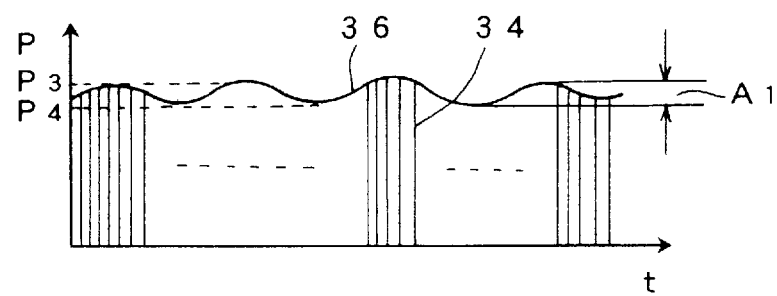

Referring to FIG. 5B, there is shown another case where the optical power P in the optical path OP is modulated by a main signal 34 and a superimposing signal 36 slower than the main signal 34. The vertical axis represents optical power P, and the horizontal axis represents time t. The frequency (bit rate or speed) of the main signal 34 is about several GHz, for example, and the frequency (bit rate or speed) of the superimposing signal 36 is about several KHz to several MHz, for example. The superimposing signal 36 has an amplitude A1 smaller than the amplitude of the main signal 34. That is, the high level of the main signal 34 changes between an optical power $P_3$ and an optical power $P_4$ ($P_4<P_3$) according to the superimposing signal 36. In this case, the second peak level is provided as the difference between the first peak level and the amplitude of the superimposing signal in the peak detecting circuit 24. More specifically, the signals S11 and S12 to be supplied from the peak detecting circuit 24 to the subtracter 26 respectively correspond to the optical powers $P_3$ and $P_4$. An average optical power in the optical path OP is reflected by $(P_3-P_4)$, and a noise due to optical crosstalk is superimposed on the optical power uniformly with time. Accordingly, the average optical power in the optical path OP can be accurately monitored by the error signal ES11 output from the subtracter 26.

A supervisory signal having a constant amplitude to be superimposed on a main signal for the purpose of supervision of an optical repeater or the like may be used as the superimposing signal 36. In the case of performing stabilization of an operation point of an optical modulator by using a low-frequency signal as disclosed in U.S. Pat. No. 5,170,274, the low-frequency signal may be used as the superimposing signal 36. In the case that such a supervisory signal or a low-frequency signal as mentioned above is not used, the superimposing signal 36 may be superimposed on the main signal 34 with a small modulation factor by using a dedicated optical modulator.

Figure 6:
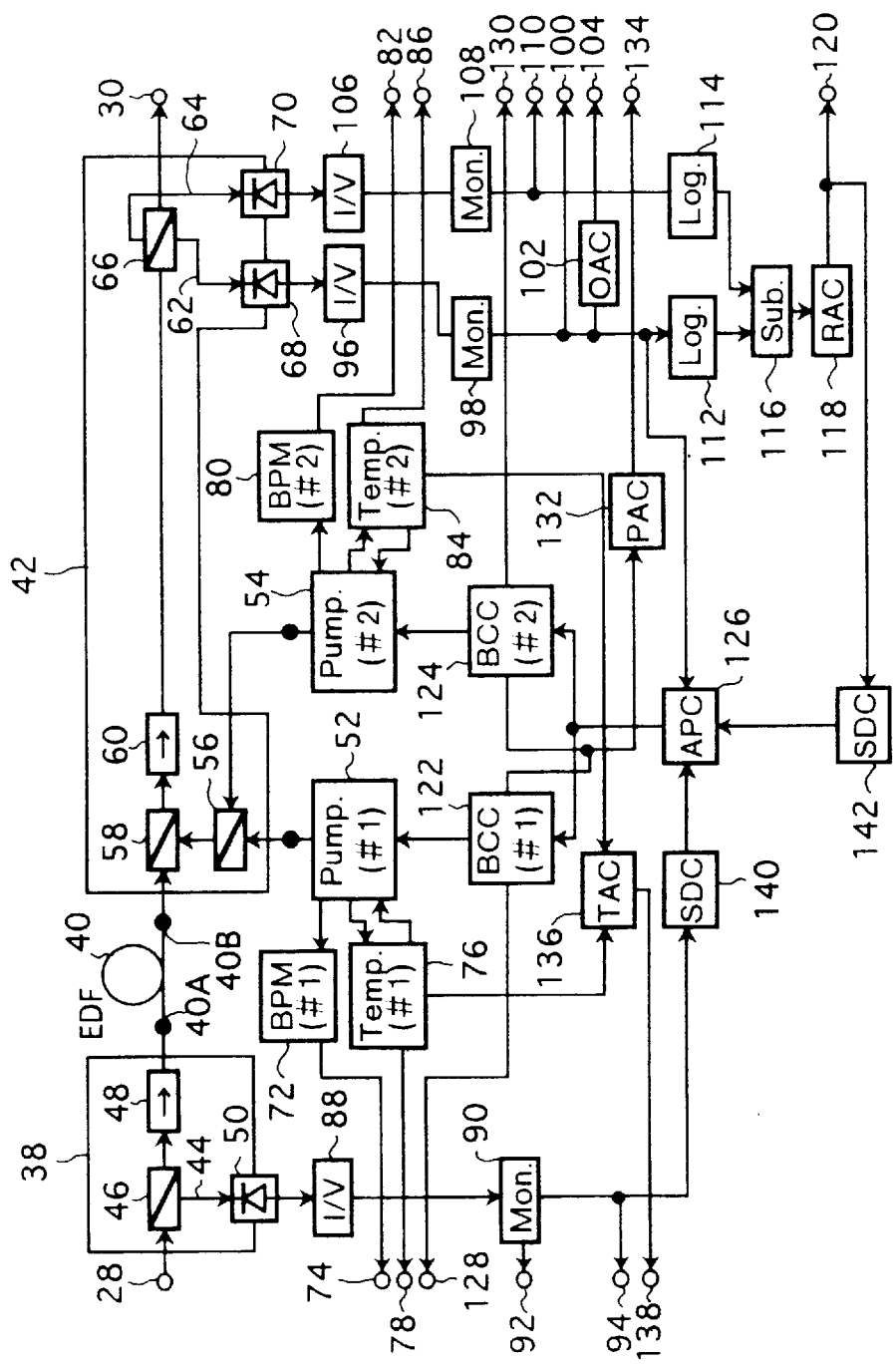
FIG. 6 is a block diagram showing a preferred embodiment of the optical amplifier to which the present invention is applicable.

Referring to FIG. 6, there is shown a preferred embodiment of the optical amplifier to which the present invention is applicable. This optical amplifier includes a front-stage optical module 38, an erbium doped fiber (EDF) 40 as the optical amplifying medium, and a rear-stage optical module 42, which are arranged in this order along an optical path extending from the input port 28 to the output port 30.

The front-stage optical module 38 includes an optical coupler 46 for separating a monitor beam 44 from signal light supplied to the input port 28, an optical isolator 48 for passing signal light from the optical coupler 46, and a photodiode 50 for receiving the monitor beam 44.

The EDF 40 has a first end 40A and a second end 40B operatively connected to the input port 28 and the output port 30, respectively. The signal light passed through the optical isolator 48 is supplied from the first end 40A into the EDF 40.

Two pump LD modules 52 and 54 are used to pump the EDF 40 so that the EDF 40 has a gain band including the wavelength of the signal light. Each of the modules 52 and 54 has an LD (laser diode) as a pump light source. The wavelength of pump light to be output from each LD falls within a band of 0.98 $\mu$m or 1.48 $\mu$m, for example.

The rear-stage optical module 42 has a polarization beam splitter 56 for combining the pump light from the pump LD modules 52 and 54 to output a pump beam. The pump beam is supplied through an optical coupler 58 of a wavelength-division multiplexing (WDM) type to the EDF 40 from its second end 40B. The signal light amplified in the EDF 40 is passed through the optical coupler 58 and an optical isolator 60 in this order.

The rear-stage optical module 42 further includes an optical coupler 66 for separating monitor beams 62 and 64 between the optical isolator 60 and the output port 30, and photodiodes 68 and 70 for respectively receiving the monitor beams 62 and 64. The monitor beam 62 corresponds to amplified signal light directed from the optical isolator 60 to the output port 30 (this beam will be hereinafter referred to as "forward beam"), and the monitor beam 64 corresponds to a beam directed from the output beam 30 to the optical isolator 60 (this beam will be hereinafter referred to as "backward beam"). In this preferred embodiment, the backward beam is monitored for the reason of preventing laser hazard in case of disconnection of an optical connector (not shown) operatively connected to the output port 30. That is, if the optical connector is disconnected, Fresnel reflection on a fiber end face becomes large to increase the power of the backward beam. Therefore, such an increase in power is intended to be monitored.

A back power monitor (BPM) 72 for the LD included in the pump LD module 52 is provided to monitor the power of the pump light output from the module 52. A signal obtained in the back power monitor 72 is output from a port 74. A temperature controller 76 is provided to maintain the temperature of the LD in the pump LD module 52 constant. The temperature controller 76 functions also to monitor the temperature of the LD and output the result of the temperature monitoring from a port 78. There are also provided a back power monitor 80, a port 82, a temperature is controller 84, and a port 86 for the pump LD module 54, which respectively correspond to the back power monitor 72, the port 74, the temperature controller 76, and the port 78.

A photocurrent generated in the photodiode 50 according to the power of the monitor beam 44 is converted into a voltage signal in an I/V converter 88. This voltage signal is supplied to a monitor circuit 90 to which the present invention is applicable. The monitor circuit 90 outputs from a port 92 an input level monitor signal corresponding to the power of the beam supplied to the input port 28, and also outputs an input reduction alarm signal from a port 94 when the input level monitor signal becomes smaller than a predetermined value.

A photocurrent generated in the photodiode 68 according to the power of the monitor beam 62 is converted into a voltage signal in an I/V converter 96. This voltage signal is supplied to a monitor circuit 98 to which the present invention is applicable. The monitor circuit 98 outputs from a port 100 an output level monitor signal corresponding to the power of the beam to be output from the output port 30, and also outputs this monitor signal to an output alarm circuit (OAC) 102. The output alarm circuit 102 outputs an output alarm signal from a port 104 when the output level monitor signal deviates from a predetermined range.

A photocurrent generated in the photodiode 70 according to the power of the monitor beam 64 is converted into a voltage signal in an I/V converter 106. This voltage signal is supplied to a-monitor circuit 108 to which the present invention is applicable. The monitor circuit 108 outputs from a port 110 a reflection level monitor signal corresponding to the power of the backward beam.

In this preferred embodiment, generation or increase of returned light is detected according to a ratio in power between the backward beam and the forward beam. To this end, the output level monitor signal and the reflection level monitor signal are supplied to logarithmic converters 112 and 114, respectively. A subtracter 116 is provided to obtain a difference between the output levels of the logarithmic converters 112 and 114. The ratio in power between the backward beam and the forward beam is reflected in an output signal from the subtracter 116. The output signal from the subtracter 116 is supplied to a returned light alarm circuit (RAC) 118 when the difference in output level between the logarithmic converters 112 and 114 becomes larger than a predetermined value, the alarm circuit 118 determines that the power of the backward beam has been increased, and then outputs a returned light alarm signal from a port 120.

Bias current circuits (BCC) 122 and 124 are provided to apply bias currents to the LDs in the pump LD modules 52 and 54, respectively. The bias current to be output from each of the bias current circuits 122 and 124 is controlled by an APC (automatic power control) circuit 126 so that the output level monitor signal from the monitor circuit 98 is maintained constant. The bias current circuit 122 monitors the bias current to be supplied to the module 52 and outputs the result of this monitoring from a port 128. The bias current circuit 124 monitors the bias current to be supplied to the module 54 and outputs the result of this monitoring from a port 130.

A pump alarm circuit (PAC) 132 is connected to the bias current circuits 122 and 124, so as to monitor abnormality of pumping. The alarm circuit 132 outputs a pump alarm signal from a port 134 when at least one of the bias currents deviates from a predetermined range.

A temperature alarm circuit (TAC) 136 is connected to the temperature controllers 76 and 84, so as to monitor abnormality of temperatures of the two pump LDs. The alarm circuit 136 outputs a temperature alarm signal from a port 138 when the temperature of at least one of the pump LDs deviates from a predetermined range.

Shutdown circuits (SDC) 140 and 142 for the bias currents to the pump LDs are connected to the APC circuit 126, so as to stop pumping in case of abnormality. The shutdown circuit 140 stops the pumping of the EDF 40 when receiving the input reduction alarm signal from the monitor circuit 90. The reason for this operation of the shutdown circuit 140 is to determine that the supply of signal light to the input port 28 has become off when the input reduction alarm signal is generated, thereby preventing abnormal increase in the power of the pump beam. The shutdown circuit 142 stops the pumping of the EDF 40 when receiving the returned light alarm signal. The reason for this operation of the shutdown circuit 142 is to determine that the above-mentioned optical connector has been disconnected when the returned light alarm signal is generated, thereby avoiding laser hazard.

Figure 7:
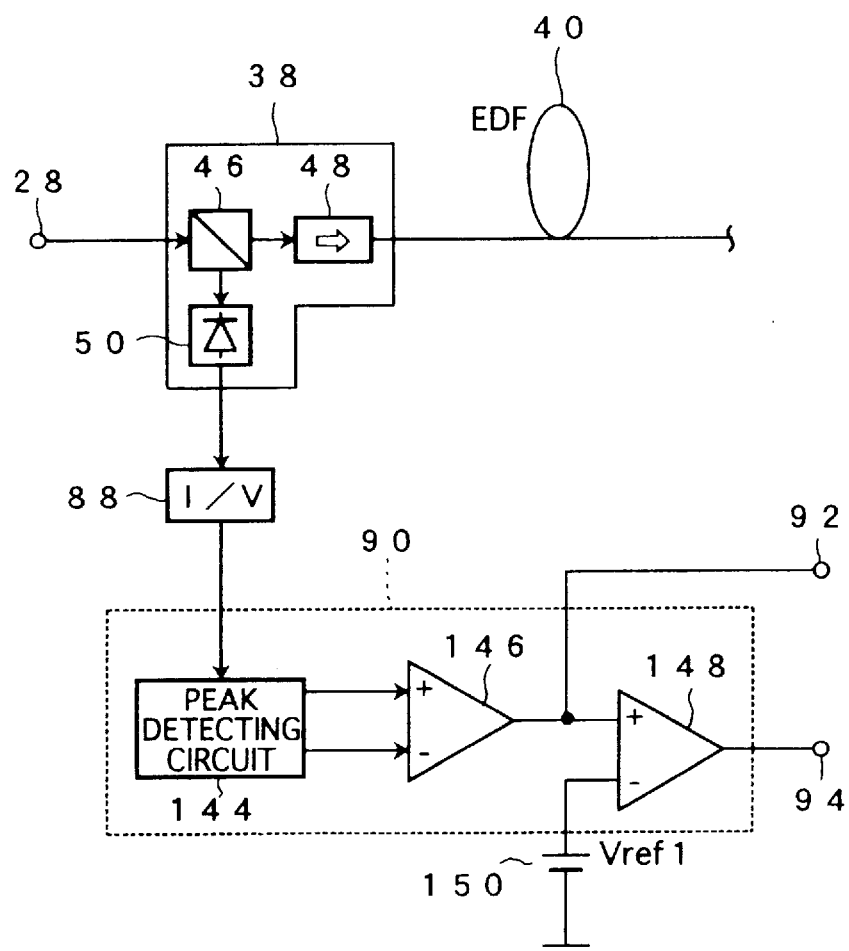
FIG. 7 is a block diagram showing a first preferred embodiment of the optical power monitor device.

Referring to FIG. 7, there is shown a first preferred embodiment of the optical power monitor device.

This device is applicable to the monitor circuit 90 shown in FIG. 6.

The monitor circuit 90 has a peak detecting circuit 144 and an operational amplifier 146 respectively corresponding to the peak detecting circuit 24 and the subtracter 26 shown in FIG. 3. A voltage signal from the I/V converter 88 is supplied to the peak detecting circuit 144, and two voltage signals from the peak detecting circuit 144 are supplied to a positive input port and a negative input port of the operational amplifier 146, respectively. Accordingly, an error signal output from the operational amplifier 146 is a voltage signal (input level monitor signal), and this error signal is supplied to the port 92 and a comparator 148. The comparator 148 compares a voltage level of the supplied error signal with a reference voltage Vref1 (voltage source 150), and outputs an input reduction alarm signal when the voltage level of the error signal becomes lower than the reference voltage Vref1.

When the input reduction alarm signal is generated, the shutdown circuit 140 shown in FIG. 6 is operated to stop the supply of the bias currents to the pump LD modules 52 and 54, thus stopping the pumping of the EDF 40.

Generally, in the optical amplifier as shown in FIG. 6, ASE generated in the EDF 40 is supplied from the first end 40A to the front-stage optical module 38, and a residual component of the pump light having not contributed to the pumping of the EDF 40 is also supplied to the front-stage optical module 38. Such undesired light causes optical crosstalk. According to the preferred embodiment shown in FIG. 7, the second basic configuration shown in FIG. 3 is applied to the monitor circuit 90, the optical power at the input port 28 can be accurately monitored without the influence of the optical crosstalk mentioned above.

Particularly in the case that the optical amplifier is provided in an optical repeater or an optical receiver, the optical power at the input port 28 is considerably small such as about −30 dBm and it is accordingly susceptible to optical crosstalk. Therefore, this preferred embodiment is effective in such a case.

Further, according to this preferred embodiment, the pumping of the EDF 40 is stopped according to the input reduction alarm signal, so that abnormal increase in power of the pump beam upon cutting off the supply of signal light to be amplified can be prevented.

Figure 8:
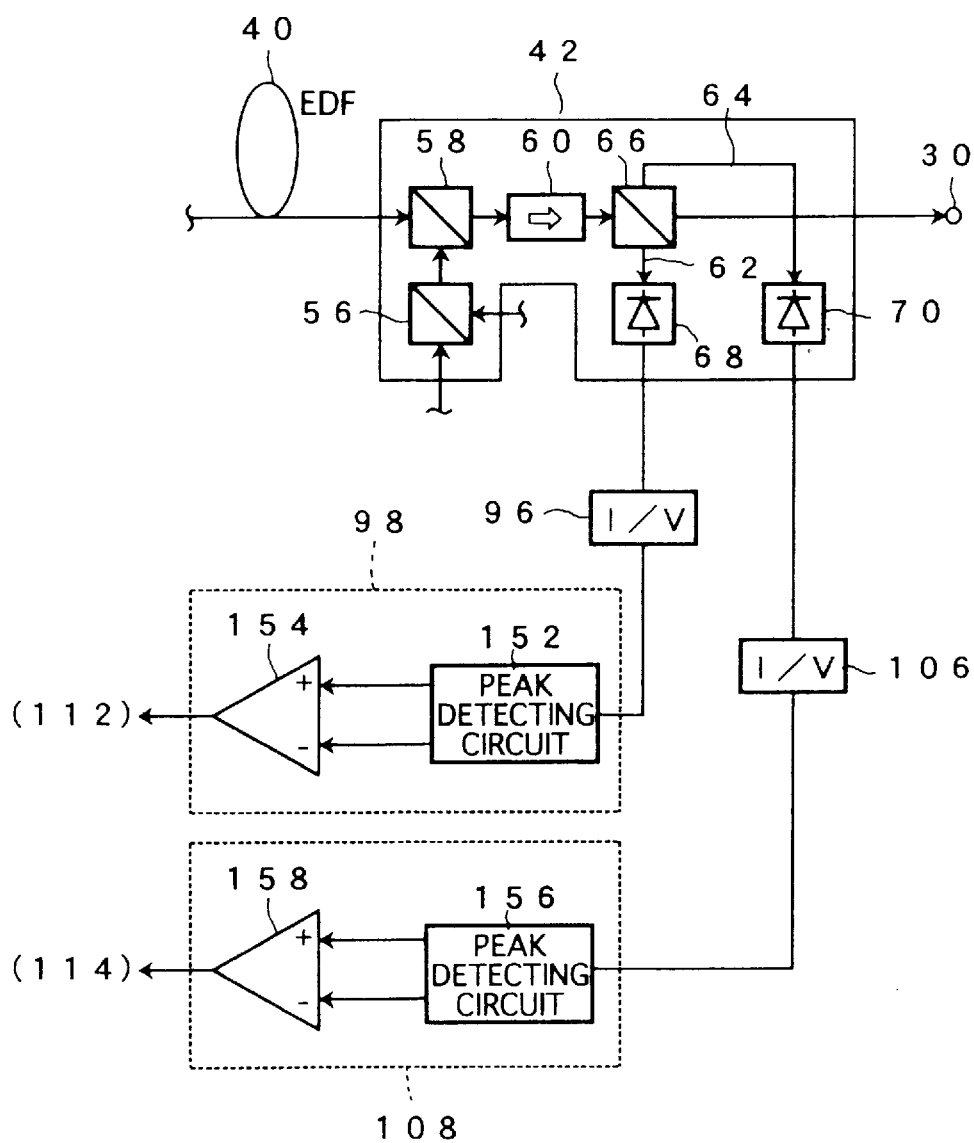
FIG. 8 is a block diagram showing second and third preferred embodiments of the optical power monitor device.

Referring to FIG. 8, there are shown second and third preferred embodiments of the optical power monitor device. The second and third preferred embodiments are applicable to the monitor circuits 98 and 108 shown in FIG. 6, respectively.

The monitor circuit 98 has a peak detecting circuit 152 and an operational amplifier 154 respectively corresponding to the peak detecting circuit 24 and the subtracter 26 shown in FIG. 3. A voltage signal from the I/V converter 96 is supplied to the peak detecting circuit 152, and two voltage signals output from the peak detecting circuit 152 are supplied to a positive input port and a negative input port of the operational amplifier 154, respectively. An error signal (output level monitor signal) output from the operational amplifier 154 is supplied to the port 100, the output alarm circuit 102, the logarithmic converter 112, and the APC circuit 126 shown in FIG. 6.

The monitor circuit 108 has a peak detecting circuit 156 and an operational amplifier 158 respectively corresponding to the peak detecting circuit 24 and the subtracter 26 shown in FIG. 3. A voltage signal from the I/V converter 106 is supplied to the peak detecting circuit 156, and two voltage signals output from the peak detecting circuit 156 are supplied to a positive input port and a negative input port of the operational amplifier 158. An error signal (reflection level monitor signal) output from the operational amplifier 158 is supplied to the port 110 and the logarithmic converter 114 shown in FIG. 6.

According to the second and third preferred embodiments, the second basic configuration shown in FIG. 3 is applied to each of the monitor circuits 98 and 108, thereby allowing accurate monitoring of optical power without the influence of optical crosstalk.

Further, the bias current to be supplied to each of the pump LD modules 52 and 54 shown in FIG. 6 is controlled by the APC circuit 126 so that the error signal output from the monitor circuit 98 becomes constant, thereby maintaining the output level of the optical amplifier constant.

Further, generation of returned light can be accurately detected according to the ratio in power between the backward beam and the forward beam in the rear-stage optical module 42. That is, when the difference in output level between the logarithmic converters 112 and 114 becomes larger than a predetermined value, the returned light alarm signal is generated. Accordingly, an increase in returned light due to disconnection of the optical connector or the like can be easily detected. Further, the shutdown circuit 142 is operated in response to the generation of the returned light alarm signal, thereby quickly stopping the pumping of the EDF 40 and therefore avoiding laser hazard.

Figure 9:
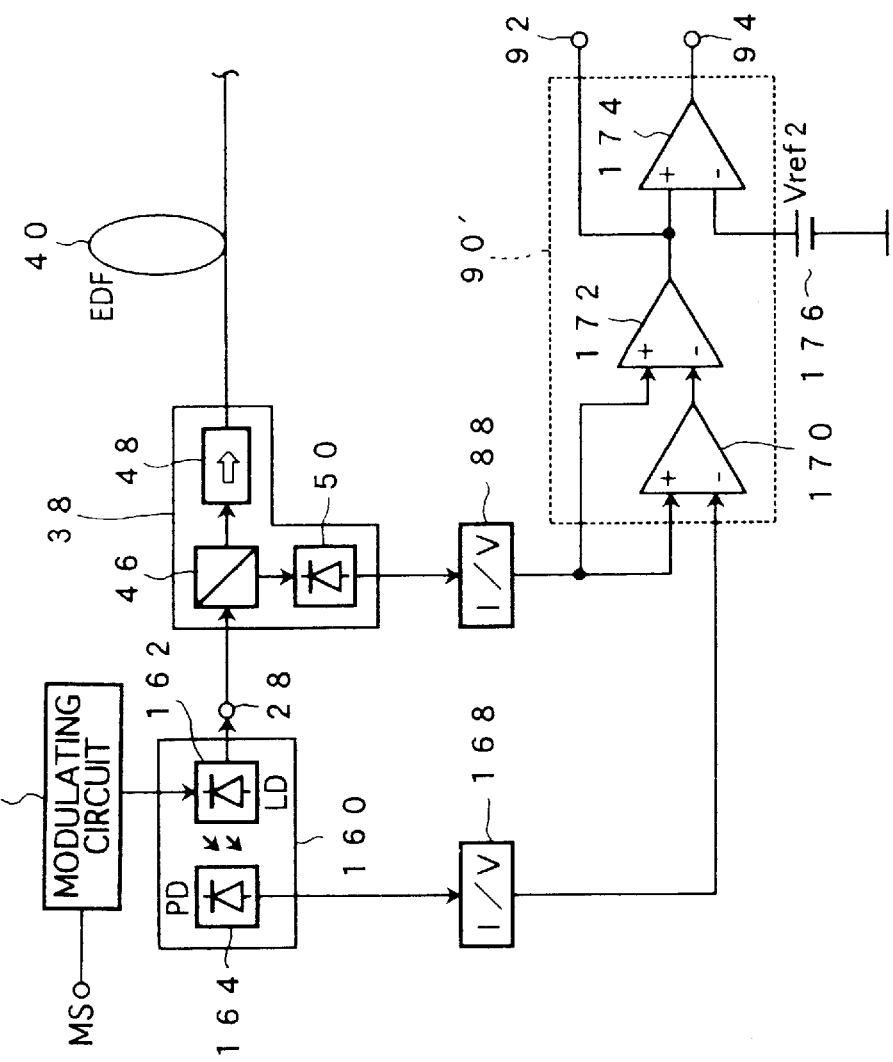
FIG. 9 is a block diagram showing a fourth preferred embodiment of the optical power monitor device.

Referring to FIG. 9, there is shown a fourth preferred embodiment of the optical power monitor device. In this preferred embodiment, a light source module 160 is added to the optical amplifier shown in FIG. 6. That is, this preferred embodiment provides an optical transmitter having this optical amplifier as a post-amplifier.

The light source module 160 has a laser diode (LD) 162 for outputting forward light and backward light, and a photodiode 164 for receiving the backward light from the LD 162. The forward light from the LD 162 is supplied to the input port 28. A modulating circuit 166 for changing a drive current for the LD 162 according to a main signal MS is provided to modulate the LD 162. A low-speed photodiode not responsive to the main signal MS is used as the photodiode 164, so that a photocurrent corresponding to an average output power of the LD 162 is generated in the photodiode 164. This photocurrent is converted into a voltage signal by an I/V converter 168.

A monitor circuit 90' corresponding to the monitor circuit 90 shown in FIG. 6 is used. The monitor circuit 90' has operational amplifiers 170 and 172 respectively corresponding to the first subtracter 10 and the second subtracter 12 shown in FIG. 1. Voltage signals from the I/V converters 88 and 168 are supplied to a positive input port and a negative input port of the operational amplifier 170, respectively. The output voltage signal from the I/V converter 88 is supplied also to a positive input port of the operational amplifier 172, and an error signal provided as an output voltage signal from the operational amplifier 170 is supplied to a negative input port of the operational amplifier 172. An error signal (input level monitor signal) provided as an output voltage signal from the operational amplifier 172 is supplied to the port 92 and a comparator 174. The comparator 174 compares a voltage level of the error signal supplied from the operational amplifier 172 with a reference voltage Vref2 (voltage source 176), and supplies an input reduction alarm signal to the port 94 when the voltage level of the error signal becomes lower than the reference voltage Vref2.

According to this preferred embodiment, when the input reduction alarm signal is generated, it can be determined that the LD 162 has become off. Further, when the LD 162 becomes off, the shutdown circuit 140 shown in FIG. 6 is operated according to the input reduction alarm signal, thereby stopping the pumping of the EDF 40. Accordingly, abnormal increase in the bias currents to be supplied to the pump LD modules 52 and 54 can be prevented.

Further, the influence of optical crosstalk is eliminated in accordance with the principle described with reference to FIG. 1, thereby allowing accurate monitoring of the output power of the LD 162.

It is to be noted that the present invention is not limited by the preferred embodiments mentioned above. For example, while the optical transmitter having the post-amplifier (the optical amplifying medium 16 and the pumping means 18) has been described with reference to FIG. 2, an optical transmitter having no post-amplifier is also included in the scope of the present invention. For example, in the case that the optical power monitor device shown in FIG. 1 is applied to an optical transmitter having no optical post-amplifier, the output power of the light source 2 can be accurately monitored according to the error signal ES2 output from the second subtracter 12. Accordingly, by providing a feedback loop such that the monitored optical power becomes constant, automatic power control (APC) of the optical transmitter is allowed. Thus, the scope of the invention is defined by the appended claims and all changes and modifications as fall within the equivalence of the scope of the claims are therefore to be embraced by the invention.

What is claimed is:

1. An optical power monitor device for a light source outputting first and second beams, comprising:

a beam splitter for receiving said first beam and dividing said first beam into first and second branch beams;

a first photodetector for receiving said first branch beam and outputting a first signal having a level corresponding to a power of said first branch beam;

a second photodetector for receiving said second beam and outputting a second signal having a level corresponding to a power of said second beam;

a first subtracter for receiving said first and second signals and outputting a first error signal corresponding to a difference between said first and second signals; and a second subtracter for receiving said first signal and said first error signal and outputting a second error signal corresponding to a difference between said first signal and said first error signal.

2. An optical power monitor device according to claim 1, further comprising an optical waveguide structure operatively connected to said beam splitter;

said second branch beam being supplied to said optical waveguide structure.

3. An optical power monitor device according to claim 2, wherein said optical waveguide structure includes an optical amplifying medium generating amplified spontaneous emission.

4. An optical power monitor device according to claim 1, wherein said second error signal is a voltage signal;

said device further comprising means for determining whether said light source is on or off by comparing a voltage level of said second error signal with a reference voltage.

5. An optical power monitor device according to claim 1, wherein said light source comprises a laser diode;

said laser diode outputting forward light and backward light;

said forward light and said backward light corresponding to said first beam and said second beam, respectively.

6. An optical transmitter comprising:

a light source for outputting first and second beams;

a beam splitter for receiving said first beam and dividing said first beam into first and second branch beams;

an optical amplifying medium for receiving said second branch beam;

means for pumping said optical amplifying medium so that said optical amplifying medium has a gain band including a wavelength of said second branch beam;

a first photodetector for receiving said first branch beam and outputting a first signal having a level corresponding to a power of said first branch beam;

a second photodetector for receiving said second beam and outputting a second signal having a level corresponding to a power of said second beam;

a first subtracter for receiving said first and second signals and outputting a first error signal corresponding to a difference between said first and second signals; and a second subtracter for receiving said first signal and said first error signal and outputting a second error signal corresponding to a difference between said first signal and said first error signal.

7. An optical transmitter according to claim 6, further comprising means operatively connected to said light source, for modulating at least said first beam of said first and second beams according to a main signal.

8. An optical transmitter according to claim 6, wherein said optical amplifying medium comprises a doped fiber doped with a rare earth element, said doped fiber having a first end and a second end;

said second branch beam being supplied from said first end into said doped fiber;

said pumping means comprising a pump laser diode supplied with a bias current to output pump light, and means operatively connected to at least one of said first end and said second end of said doped fiber, for supplying said pump light into said doped fiber.

9. An optical transmitter according to claim 8, wherein said doped fiber is an erbium doped fiber;

said gain band including a wavelength of 1.55 $\mu$m.

10. An optical transmitter according to claim 8, wherein said second error signal is a voltage signal;

said optical transmitter further comprising a comparator for comparing a voltage level of said second error signal with a reference voltage, and means operatively connected to said comparator, for stopping supply of said bias current to said pump laser diode when said voltage level of said second error signal becomes lower than said reference voltage.

11. An optical power monitor device for an optical amplifier having an optical path including an optical amplifying medium, comprising:

a photodetector operatively connected to said optical path, for outputting an electrical signal having a level corresponding to an optical power in said optical path;

a peak detecting circuit for receiving said electrical signal and outputting a first signal providing a first peak level corresponding to a maximum level of said electrical signal and a second signal providing a second peak level lower than said first peak level; and a subtracter for receiving said first and second signals and outputting an error signal corresponding to a difference between said first and second signals.

12. An optical power monitor device according to claim 11, wherein said optical power in said optical path is modulated by a main signal having a high level and a low level;

said first and second peak levels corresponding to said high level and said low level, respectively.

13. An optical power monitor device according to claim 11, wherein said optical power in said optical path is modulated by a main signal and a superimposing signal slower than said main signal;

said superimposing signal having a first amplitude smaller than a second amplitude of said main signal;

said second peak level being provided as a difference between said first peak level and said first amplitude.

14. An optical amplifier comprising:

an optical amplifying medium provided in an optical path between an input port and an output port;

means for pumping said optical amplifying medium so that said optical amplifying medium has a gain band;

a beam splitter for dividing an optical beam propagating along said optical path into first and second branch beams;

a photodetector for receiving said first branch beam and outputting an electrical signal having a level corresponding to a power of said first branch beam;

a peak detecting circuit for receiving said electrical signal and outputting a first signal providing a first peak level corresponding to a maximum level of said electrical signal and a second signal providing a second peak level lower than said first peak level; and a subtracter for receiving said first and second signals and outputting an error signal corresponding to a difference between said first and second signals.

15. An optical amplifier according to claim 14, wherein said beam splitter is operatively connected between said input port and said optical amplifying medium.

16. An optical amplifier according to claim 15, wherein said error signal is a voltage signal;

said optical amplifier further comprising a comparator for comparing a voltage level of said error signal with a reference voltage, and means operatively connected to said comparator, for stopping pumping of said optical amplifying medium when said voltage level of said error signal becomes lower than said reference voltage.

17. An optical amplifier according to claim 14, wherein said beam splitter is operatively connected between said optical amplifying medium and said output port.

18. An optical amplifier according to claim 17, wherein said optical beam is a forward beam propagating from said optical amplifying medium toward said output port;

said forward beam being supplied to said beam splitter.

19. An optical amplifier according to claim 18, wherein said pumping means comprises means for supplying pump light to said optical amplifying medium;

said optical amplifier further comprising means for controlling a power of said pump light so that said error signal becomes constant.

20. An optical amplifier according to claim 17, wherein said optical beam is a backward beam propagating from said output port toward said optical amplifying medium;

said backward beam being supplied to said beam splitter.

21. An optical amplifier according to claim 17, wherein said optical beam comprises a forward beam propagating from said optical amplifying medium toward said output port and a backward beam propagating from said output port toward said optical amplifying medium;

said first branch beam comprising a forward branch beam as a part of said forward beam, and a backward branch beam as a part of said backward beam;

said photodetector comprising a first photodetector for receiving said forward branch beam, and a second photodetector for receiving said backward branch beam;

said peak detecting circuit comprising first and second circuits operatively connected to said first and second photodetectors, respectively;

said subtracter comprising first and second subtracters operatively connected to said first and second circuits, respectively.

22. An optical amplifier according to claim 21, further comprising means operatively connected to said first and second subtracters, for detecting returned light according to a ratio in power between said backward beam and said forward beam.

23. An optical amplifier according to claim 22, wherein said detecting means comprises first and second logarithmic converters operatively connected to said first and second subtracters, respectively, and a third subtracter for obtaining a difference in output level between said first and second logarithmic converters;

said pumping means comprising means for supplying pump light to said optical amplifying medium;

said optical amplifier further comprising means operatively connected to said third subtracter, for stopping supply of said pump light to said optical amplifying medium when said difference in output level becomes larger than a predetermined value.

24. An optical amplifier according to claim 14, wherein said optical amplifying medium comprises a doped fiber doped with a rare earth element, said doped fiber having a first end and a second end operatively connected to said input port and said output port, respectively;

said pumping means comprising a pump light source for outputting pump light, and means operatively connected to at least one of said first end and said second end of said doped fiber, for supplying said pump light to said doped fiber.

25. An optical amplifier according to claim 24, wherein said doped fiber is an erbium doped fiber;

said gain band including a wavelength of 1.55 $\mu$m.

26. An optical amplifier according to claim 14, wherein said optical beam is modulated by a main signal having a high level and a low level;

said first and second peak levels corresponding to said high level and said low level, respectively.

27. An optical amplifier according to claim 14, wherein said optical beam is modulated by a main signal and a superimposing signal slower than said main signal;

said superimposing signal having a first amplitude smaller than a second amplitude of said main signal;

said second peak level being provided as a difference between said first peak level and said first amplitude.

* * * * *